United States Patent

[11] 3,583,225

[72] Inventors Charles G. Wing
    Ipswich;
    Robert W. Steer, Haverhill, both of, Mass.
[21] Appl. No. 849,665
[22] Filed Aug. 13, 1969
[45] Patented June 8, 1971
[73] Assignee The United States of America as
    represented by the Secretary of the Navy

[54] SHIPBOARD GRAVIMETER
    7 Claims, 1 Drawing Fig.
[52] U.S. Cl. ................................................ 73/382,
    73/517
[51] Int. Cl. .............................................. G01v 7/16
[50] Field of Search .................................. 73/517 AV,
    382

[56] References Cited
    UNITED STATES PATENTS
    3,483,753 12/1969 Loeb

Primary Examiner—James J. Gill
Attorneys—R. I. Tompkins, L. I. Shrago and R. K. Tendler ABSTRACT: A system for processing gravimeter signals obtained aboard a seagoing vessel is described which eliminates short term accelerations due to pitch, roll and heave of the vessel. This system compares the frequency of the output signal from a vibrating string accelerometer with the counted-down output of a voltage controlled oscillator set to the mean frequency of the accelerometer. The frequency difference of these two signals is converted into a voltage which is filtered by a low-pass filter to remove short term acceleration components and is then coupled to the voltage controlled oscillator. The output of this oscillator is thus locked onto only the low frequency components of the accelerometer and, as such, provides a signal whose frequency is proportional only to the local gravitational acceleration.

PATENTED JUN 8 1971
3,583,225
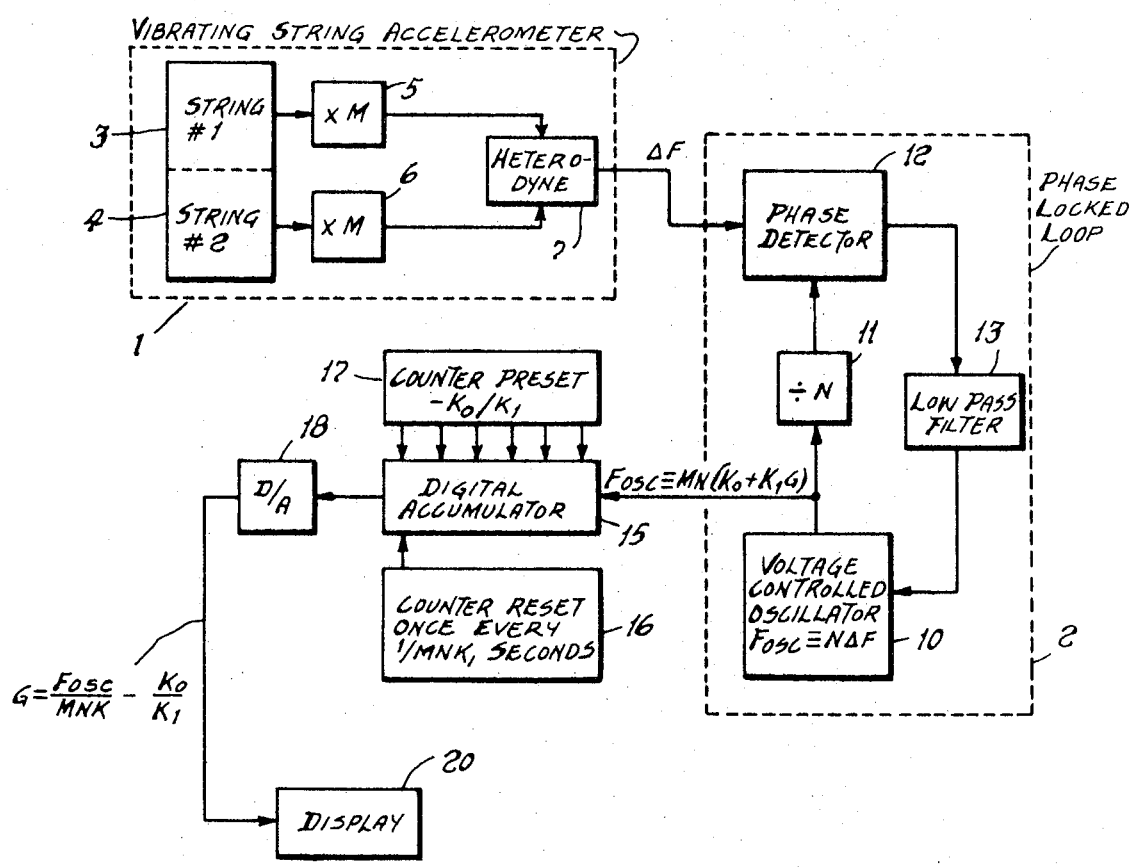
INVENTORS.
CHARLES G. WING
ROBERT W. STEER, JR.

SHIPBOARD GRAVIMETER

The invention described herein may be manufactured and used by or for the Government of the United States of America for governmental purposes without the payment of any royalties thereon or therefor.

This invention relates to a system for processing gravimeter signals obtained aboard a seagoing vessel and, more particularly, to a system for removing high frequency or short term variations in the output of a vibrating string accelerometer due to heave, pitch and roll of this vessel.

Gravity measurements taken at sea suffer primarily from short term accelerations which are caused by the pitch, roll and heave of the vessel in which the gravity sensing accelerometer is mounted. Although much of this acceleration can be removed by mounting the accelerometer on a gyrostabilized platform, further signal processing is necessary. Of the several types of gravity sensors available, one of the most sensitive is the vibrating string accelerometer which produces a signal whose frequency is proportional to the acceleration sensed. Although high frequency changes in the output of this accelerometer can be filtered from the signal by low-pass filters, high frequency components are still present in the signal to degrade the gravity measurement.

The present invention utilizes a phase-locked loop with a low-pass filter in its feedback path to eliminate more completely these high frequency components. To accomplish this, the output of the accelerometer is fed to one input of a phase detector. At the same time, the output of a voltage controlled oscillator is fed to the other input of this detector. The output of the detector is used to change the frequency of the voltage controlled oscillator until the output of the oscillator is exactly equal to the frequency of the accelerometer output, absent those components of the frequency due to short term variation. The short term components are removed by filtering the output of the phase detector so that the voltage controlling the oscillator does not contain short time or high frequency variations present at the accelerometer output. The output of the voltage controlled oscillator is thus proportional only to long term accelerations, i.e., those due to a local gravitational force. The number of oscillations of the voltage controlled oscillator per unit time when registered in an appropriate digital counter is proportional only to the local gravitational field force.

It is therefore an object of this invention to provide a system for eliminating the high frequency components of the output of a vibrating string accelerometer.

Another object of the present invention is to provide a digital-to-analog recording system for measuring local gravitational acceleration.

Other objects, advantages and novel features of the invention will become apparent from the following detailed description of the invention when considered in conjunction with the accompanying drawing, the sole FIGURE of which illustrates a vibrating string accelerometer with an improved filter and readout means.

Referring to the sole FIGURE, a vibrating string accelerometer is shown enclosed in dotted box 1 with appropriate frequency multiplication circuits to increase its output frequency. The vibrating string accelerometer is connected to a phase-locked loop circuit shown enclosed in dotted box 2. Although accelerometer 1 may be any conventional vibrating string accelerometer, a double vibrating string accelerometer is shown because of its linearity. In general, the output of a double vibrating string accelerometer is obtained by heterodyning the outputs of two vibrating strings. An accelerometer of this type is manufactured commercially by AMBAC Industries. The outputs of the two strings of this accelerometer are shown diagrammatically at 3 and 4. The outputs of these strings are multiplied by equal amounts, M, by conventional phase-locked frequency multipliers 5 and 6.

These phase-locked multipliers are conventional and in one embodiment (not shown) consist of a phase detector, a voltage controlled oscillator set initially to deliver a square wave signal M times that of the signal from the vibrating string and a divide-by-M counter. The output of the phase detector controls the voltage controlled oscillator whose output is divided by M and then returned to one of the inputs of the phase detector. The other input to the phase detector is the sinusoidal signal from the vibrating string. When a signal is received from the vibrating string, it is converted to a higher frequency M times that of the vibrating string signal by the voltage controlled oscillator. This frequency is stepped down to the frequency of the vibrating string and compared with the vibrating input. Subsequently, the oscillator is continually adjusted. The output of the oscillator is coupled to one of the inputs of heterodyning device 7 and represents an exact multiplication of the frequency of the vibrating string. The outputs of these multipliers are heterodyned by conventional circuitry at 7 to yield a sinusoidal signal $\Delta F$. The difference frequency $\Delta F$ from the heterodyning detector is:

$$\Delta F = M(K_0 a^2 z K_1 A A z K_2 A A Q 2 + K_3 a A^3 + -) \quad (1)$$

where $K_0$ is a bias term and $K_1$ is a scale factor which is equal to the frequency response of the accelerometer per unit of gravitational acceleration sensed. To the extent to which the double string geometry is perfect, all even ordered terms approach zero, thus reducing the largest nonlinear term $K_2$. When a double vibrating string is used, calibration no longer requires a gravity range traverse since only a local value of gravity and the sum of the difference frequency, $2K_1A + 2KA$ $3A^3a\lambda'$, is needed to obtain the scale factor $K_1$ to about one part in $10^5$. In one operating embodiment of this invention a double vibrating string accelerometer had the following characteristics:

$F_{strings\ 1\ and\ 2}$ ---------------------------- Hz __ 9,300
$K_0$ ---------------------------------------- Hz __ 7
$K_1$ ---------------------------------------- Hz./G __ 128
$K_2$ ---------------------------------------- Hz./G² __ −0.001
$K_3$ ---------------------------------------- Hz./G³ __ 0.004
$K_4$ ---------------------------------------- Hz./G⁴ __ 0.001 with an effective cross-axis sensitivity of $10^{16}$ G/G and a temperature coefficient of $20 \times 10^{16}$ G/C°. It will be appreciated that $\Delta F$ of this accelerometer contains components which are proportional to the local gravitational field and miscellaneous short term accelerations. These latter accelerations are removed in the phase-locked loop section of the subject signal processing circuit.

The phase-locked loop is composed of a voltage controlled oscillator 10, a countdown device 11, a phase detector 12 and a low-pass filter 13.

The output of accelerometer 1, $\Delta F$, is the frequency which is to be duplicated by the counted-down component of the voltage controlled oscillator shown diagrammatically at 10. This oscillator generates a square wave signal whose frequency is determined by a control voltage. The frequency of oscillator 10 is originally set at $N\Delta F$ so as to provide a higher frequency output than is derivable from accelerometer 1. It will be appreciated that the higher the frequency of the oscillator the more precise will be the gravity measurement. In one embodiment the original frequency of the oscillator was set to be 16 times that of the mean output of the accelerometer. In order to facilitate a phase determination, a conventional frequency countdown counter 11 is employed. This is a counter having a single pulsed output for every 16th square wave pulse from the oscillator. The output of counter 11 is one of the inputs to phase detector 12. This phase detector may be any device which generates a voltage proportional to the phase difference between two input signals.

A conventional phase detector which can accommodate a sine wave and a square wave at its input is described on page 741, FIGS. 19—20, of "Pulse, Digital and Switching Waveforms," Jacob Millman and Herbert Taub, published by McGraw Hill, 1965.

The phase detector used in one configuration has a linear range of $\pm 4096\pi$ radians.

The output of the phase detector controls oscillator 10 and completes the phase-locked loop. In this loop is a low-pass filter 13 which filters from the output of detector 12 the aforementioned short term variations in phase difference between $(F_{osc})/N$ and $\Delta F$. $F_{osc}$ therefore locks onto only the low frequency variations of $\Delta F$. One way of describing the operation of the phase-locked loop is to consider $\Delta F$ a constant carrier frequency corresponding to the value of a local gravitational field with a varying modulation impressed thereon corresponding to the above-mentioned short term variations. The phase-locked loop permits the voltage controlled oscillator to lock onto the carrier frequency and thus produce a signal which is directly proportional to the value of the local gravitational field.

Low-pass filter 13 is set to have a cutoff frequency between $10^{12}$ and $10^{13}$ Hz. to eliminate accelerations due to Eötvös or fishtail variation, ship's heave and ship vibration. If an active analog filter system is used, the transfer function of the network employed is made to approximate the desired low frequency response.

The filter in the phase-locked loop must meet three requirements: (1) It should separate signal and noise. Specifically, the signal at $10^{13}$ Hz. should be attenuated by less than 3 db. (30 percent) and the noise at $10^{11}$ Hz. must be attenuated by more than 100 db. ($10^5$). (2) Signals must not be amplified selectively at specific frequencies (the filter frequency response must be flat in the passband). (3) Signals should not be distorted excessively.

The second condition dictates a "Butterworth" transfer function. Since a Butterworth filter has a phase shift of 180° at the cutoff frequency $f_o$, for loop stability the phase-locked loop must be closed at a frequency lower than $f_o$. Closing the loop at $f_L=f_o/2$ ensures adequate stability. A Butterworth filter itself overshoots in its step response by $\approx 5$ percent for the second order and 8 percent for the third order. Addition of the closed-loop damps the total response to prevent overshoot. Absence of overshoot in the closed loop indicates an acceptable level of distortion of geophysical signals since a gravity step function is far worse than any natural gravity signal.

Assuming a second order Butterworth filter we can find the highest $f_o$ which will satisfy our requirements. The digital accumulator to be described integrates the input frequency for 50 seconds, effectively attenuating noise with a 10-second period by 14 db. An additional 86 db. attenuation is required from the second order Butterworth filter at $f_o$ and the closed loop at $f_L=f_o/2$. The required $f_o$ is 0.0045 Hz. with $f_o$=0.004 Hz. and $f_L$=0.002 Hz., and the ±100 gal. heave is attenuated 104 db. to ±0.6 mgal. The response time (the time required to respond 63 percent to a step input) is 160 seconds. Signals at $10^{13}$ Hz. are attenuated by 1 db. ($\approx$ 10 percent).

Using a third order Butterworth, we have more latitude in picking $f_o$. With $f_o$=0.008 Hz. and $f_L$=0.004 Hz., heave is attenuated 106 db. to ±0.5 mgal., the response time is 110 seconds and the $10^{13}$ Hz. signal is attenuated by only 0.5 db. ($\approx$ 5 percent). The single practical advantage of the third order filter is in operations requiring frequent course changes. A course change results in a step change in the Eötvös input and time required to settle to 1 mgal. is about 8 minutes for the second order and 5 minutes for the third order filter.

Choice of other low-pass filters having other transfer functions is treated in any textbook on linear circuit analysis. Active filters for use in the subject system may be found in the "Handbook of Active Filters" available from Burr-Brown Research Corporation (1966).

The output of voltage controlled oscillator 10 can be shown to be $$F_{osc}=MN(K_0+K_1G) \qquad (2)$$

where this $K_0 \cong 7$ Hz. in one application. This output is coupled to a conventional digital accumulator 15 of the type manufactured by Janus Control, Inc.

The accumulator registers the number of pulses generated by oscillator 10 every $1/(MNK_1)$ seconds so as to correspond to an equation giving the local gravitational field:

$$G=\frac{F_{osc}}{MNK_1}-\frac{K_0}{K_1} \qquad (3)$$

The accumulator is reset every $1/(MNK_1)$ seconds by a conventional reset pulse generator 16. This effectively divides by $K_1$ the number of pulses produced by oscillator 10. Equation (3) is derived from equation (2) and shows that the instantaneous value of the local gravitational field can be automatically obtained as the output of the accumulator. In order to subtract $K_0/K_1$ from $(E_{osc}/K_1$, the accumulator is preset to a number equal to $^1K_0/K_1$ by thumbwheel switches shown diagrammatically at 17. When this number is preset in the accumulator, the accumulator must count $K_0/K_1$ pulses from oscillator 10 before a positive number is obtained as the counter output. The number of pulses produced in the $1/(MNK_1)$ time interval is thus equal to the local value of $G$. If each of strings 3 and 4 vibrates at approximately 9,300 Hz. and the difference between the two frequencies, the scale factor, is 128 Hz./$G$ plus a bias of 7 Hz. assuming that a phase-locked frequency multiplication by 100 is performed on the output of each string before heterodyning and a second multiplication by 16 is made to reach the oscillator frequency, $$F_{osc} \cong 11,200 \text{ Hz.}+204,800 \text{ Hz. G/G.} \qquad (4)$$

Therefore, $MNK_0$=bias and $MNK_1$=scale factor.

The output of digital accumulator 15 is converted to an analog signal by a conventional D/A converter 18. This signal may be coupled to any type of display 20 capable of recording the amplitude of the analog signal as a function of time. Alternately, the count in the counter may be sampled at $1/MNK_1$ second intervals and the count digitally recorded.

What we claim is:

1. Apparatus for removing short term frequency variations in the output signal from an accelerometer which is subjected to both steady and short term accelerations, which accelerometer is of the type which generates an electrical signal having an instantaneous frequency proportional to the acceleration to which it is subjected, comprising:

phase detection means having one of two input circuits coupled to the output of said accelerometer and having an output circuit at which is generated a signal having an amplitude proportional to the phase difference between any pair of signals coupled to said input circuits;

an oscillator whose frequency is initially set to the mean frequency of said accelerometer and is variable about said mean frequency in response to the amplitude of a control voltage applied to a control circuit thereof, the output of said oscillator being coupled to the other input circuit of said phase detection means; and means connected between the output circuit of said phase detection means and the control circuit of said oscillator for coupling only low frequency components of the signal generated by said phase detection means to said oscillator, whereby the frequency of said oscillator is proportional only to the steady accelerations to which said accelerometer is subjected.

2. Apparatus for providing an electrical signal whose frequency is a predetermined multiple of the frequency of that component of the output signal from a vibrating string accelerometer generated by the local gravitational field to which said accelerometer is subjected, comprising:

a phase detector having one of its two inputs coupled to the output of said accelerometer and having an output circuit at which is generated a signal having an amplitude proportional to the phase difference between any pair of signals coupled to said inputs;

a voltage controlled oscillator having a center frequency equal to a predetermined multiple of the mean frequency of the output signal from said accelerometer and having a control circuit which varies the output frequency of said oscillator about said center frequency in response to the amplitude of a control voltage applied thereto;

a low pass filter;

means for connecting said low-pass filter between the output circuit of said detector and the voltage control circuit of said oscillator, whereby only low frequency components of the signal from said detector are coupled to said oscillator;

means coupled to the output of said oscillator for producing a signal which has a frequency exactly equal to the frequency of said oscillator divided by said predetermined multiple; and means for coupling last-mentioned signal to the other input of said phase detector so as to provide said detector with a second input signal in addition to that supplied by said accelerometer, whereby the signal available at the output of said oscillator has a frequency which is proportional only to said local gravitational acceleration.

3. A system for processing signals generated by a vibrating string accelerometer and for determining the strength of the gravitational field to which said accelerometer is subjected, comprising:

a phase detector having one of its two inputs coupled to the output of said accelerometer so as to provide said detector with a first input signal and having an output at which is provided a signal whose amplitude represents the phase difference between any pair of signals coupled to said inputs;

a voltage controlled oscillator for producing a pulsed output signal having a center frequency equal to N times the mean frequency of the output signal from said accelerometer where N is a predetermined positive integer and having a control circuit which varies the output frequency of said oscillator about said center frequency in response to the amplitude of a control voltage applied thereto;

means coupled to the output of said oscillator for producing a signal at its output which has a frequency exactly equal to the frequency of said oscillator divided by N;

means for coupling the output of said last-mentioned means to the other input of said phase detector so as to provide said detector with a second input signal;

a low-pass filter for attenuating the high frequency components of the signal generated at the output of said phase detector;

means for connecting said low-pass filter between the output of said detector and the control circuit of said oscillator whereby only low frequency components of the signal from said detector are coupled to said oscillator; and means for registering the number of output pulses generated by said oscillator during a predetermined time interval, whereby said number is proportional to the gravitational field to which said accelerometer is subjected.

4. The apparatus as recited in claim 3 wherein said registering means includes:

a digital accumulator preset to a negative number equal to the bias of said accelerometer divided by the scale factor of said accelerometer; and means for periodically resetting said accumulator after a time period equal to the reciprocal of N times said scale factor has elapsed, whereby the number accumulated in said accumulator during said time period is equal to the gravitational acceleration to which said accelerometer is subjected.

5. A system for measuring local gravitational accelerations at sea comprising:

a vibrating string accelerometer which generates a first signal having a frequency proportional to accelerations to which it is subjected;

means for multiplying the frequency of said signal by a positive integer, M, so as to produce a second signal M times greater in frequency than said first signal;

a phase detector having one of its two inputs coupled to the output of said multiplying means and having an output which provides a signal whose amplitude represents the phase difference between signals coupled to said inputs;

a voltage controlled oscillator having a center frequency N times the mean frequency output of said multiplying means and having a control circuit which varies the output frequency of said oscillator about said center frequency in response to the amplitude of a control voltage applied thereto;

a low-pass filter;

means for connecting said low-pass filter between the output of said detector and the control circuit of said oscillator so as to complete a feedback loop to said oscillator which loop contains only low frequency components of the signal from said detector;

divide-by-N means coupled between the output of said oscillator and the other input of said detector to provide said detector with a signal whose frequency corresponds to that component of the frequency of said second signal due only to gravitational accelerations; and means coupled to the output of said oscillator for registering the number of oscillations generated by said oscillator during a predetermined time interval.

6. Apparatus as recited in claim 5 wherein said means for registering includes a digital accumulator; and means for presetting said accumulator to a negative number equal to the bias of said accelerometer divided by the scale factor of said accumulator, said accumulator being reset after a predetermined time period has elapsed, said time period being equal to the reciprocal of MN times said scale factor.

7. The apparatus as recited in claim 6 wherein said vibrating string accelerometer has a double string configuration in which each of the string output frequencies is multiplied M and subsequently heterodyned to produce a difference frequency which is proportional to the local gravitational field sensed.